United States Patent
Yuan et al.

(10) Patent No.: US 12,209,188 B2
(45) Date of Patent: Jan. 28, 2025

(54) ULTRAFINE MODIFIED HYDROMAGNESITE COMPOSITE POWDER, AND PREPARATION METHOD AND APPLICATION THEREOF

(71) Applicant: Hunan Institute of Science and Technology, Yueyang (CN)

(72) Inventors: Yongbing Yuan, Yueyang (CN); Junkang Shi, Yueyang (CN); Congshan Zhou, Yueyang (CN); An Li, Yueyang (CN); Lijun Li, Yueyang (CN); Jundong Xu, Yueyang (CN); Hao Ma, Yueyang (CN)

(73) Assignee: Hunan Institute of Science and Technology, Yueyang (CN)

( * ) Notice: Subject to any disclaimer, the term of this patent is extended or adjusted under 35 U.S.C. 154(b) by 0 days.

(21) Appl. No.: 18/807,393

(22) Filed: Aug. 16, 2024

(65) Prior Publication Data
US 2024/0409748 A1  Dec. 12, 2024

(51) Int. Cl.
C09C 1/02 (2006.01)
C08J 3/20 (2006.01)
(Continued)

(52) U.S. Cl.
CPC ............... *C09C 1/028* (2013.01); *C08J 3/203* (2013.01); *C08K 9/04* (2013.01); *C09C 3/003* (2013.01);
(Continued)

(58) Field of Classification Search
None
See application file for complete search history.

(56) References Cited

U.S. PATENT DOCUMENTS

2007/0111879 A1    5/2007  Kong
2014/0104023 A1*   4/2014  Yang ................. B22F 1/16
                                          428/407
(Continued)

FOREIGN PATENT DOCUMENTS

CN    116444862 A  *  7/2023

OTHER PUBLICATIONS

CNIPA, Notification of First Office Action for Chinese application CN202410013003.2, May 10, 2024.
(Continued)

*Primary Examiner* — Peter A Salamon
(74) *Attorney, Agent, or Firm* — Hemisphere Law, PLLC; Zhigang Ma

(57) ABSTRACT

The present invention provides an ultrafine modified hydromagnesite powder, and a preparation method and application thereof. The preparation method comprises the following steps: drying ultrafine hydromagnesite, then adding a certain amount of organic dispersion reagent, isocyanate compound and catalyst, stirring at a certain temperature for a period of time, filtering, washing and drying to obtain powder 1; taking the powder 1, a certain amount of organic dispersion reagent and fatty amine, stirring at a certain temperature for a period of time, filtering, washing and drying to obtain the ultrafine modified hydromagnesite powder. The powder is mixed with polyethylene and an auxiliary agent, and extruded for granulation at 160-200° C. to obtain polyethylene composite material. The material has excellent tensile strength and flame retardant property.

9 Claims, 2 Drawing Sheets preliminary modified powder

Ultrafine modified hydromagnesite composite powder

(51) Int. Cl.
 *C08K 9/04* (2006.01)
 *C09C 3/00* (2006.01)
 *C09C 3/04* (2006.01)
 *C09C 3/08* (2006.01)

(52) U.S. Cl.
 CPC .............. *C09C 3/006* (2013.01); *C09C 3/043* (2013.01); *C09C 3/08* (2013.01); *C01P 2004/61* (2013.01); *C01P 2004/62* (2013.01); *C08J 2323/06* (2013.01); *C08K 2201/005* (2013.01)

(56) References Cited

U.S. PATENT DOCUMENTS

2015/0184027 A1* 7/2015 Huang ..................... C09G 1/02
 51/309
2019/0100661 A1* 4/2019 Stogner ................... C08K 7/04

OTHER PUBLICATIONS

CNIPA, Notification to grant patent right for Chinese application CN202410013003.2, May 20, 2024.

\* cited by examiner

ULTRAFINE MODIFIED HYDROMAGNESITE COMPOSITE POWDER, AND PREPARATION METHOD AND APPLICATION THEREOF

TECHNICAL FIELD

The present invention belongs to the technical field of functional materials, and discloses an ultrafine modified hydromagnesite composite powder, and a preparation method and application thereof.

BACKGROUND

The main chemical component of hydromagnesite is basic magnesium bicarbonate which is abundant in Xizang area of China. During the exothermic decomposition of hydromagnesite, MgO, $CO_2$, and $H_2O$ are generated, which can lower the ambient temperature and prevent the contact between combustible materials and oxygen, thereby acting as a flame retardant. Therefore, ultrafine hydromagnesite powder can be utilized as a flame retardant filler in polymer materials. However, it is found through research that due to strong hydrophilicity, hydromagnesite powder lacks compatibility with most polymers and is difficult to distribute evenly in polymer matrixes without certain modification treatment, thereby generating negative impacts on the mechanical performance of the matrix material.

As kind of mature and reliable polymer, polyethylene is often used as a film, a cable, a rope, a packaging bag, a tube and the like. Although polyethylene has stable chemical property, polyethylene has poor mechanical performance and low melting point and is flammable, which limits the use of polyethylene in some occasions. Therefore, it is necessary to add fillers that can play the roles of toughening and inflaming retarding into polyethylene to improve the tensile strength and flame retardant property of polyethylene.

In conclusion, it is urgent to develop an ultrafine modified hydromagnesite composite powder and a preparation method thereof in this field to serve as a filler for a polyethylene matrix, so as to improve the tensile strength and the flame retardant property of composite material.

SUMMARY

To solve the above technical problems, a purpose of the present invention is to provide an ultrafine modified hydromagnesite composite powder, and a preparation method and application thereof, to prepare an inorganic composite polyethylene flame retardant material to have more excellent flame retardant property, mechanical performance and more economy and environmental protection.

In order to achieve the above purpose, the present invention provides an ultrafine modified hydromagnesite composite powder, and a preparation method and application thereof. The method comprises the following steps:

(1) drying ultrafine hydromagnesite powder, then adding a certain amount of organic dispersion reagent and stirring to obtain suspension A;

(2) adding an isocyanate compound and a catalyst to the suspension A, stirring at a certain temperature for a period of time to obtain suspension B, filtering, washing and drying to obtain preliminary modified hydromagnesite powder;

(3) taking the modified hydromagnesite powder, adding a certain amount of organic dispersion reagent, and stirring to obtain suspension C;

(4) adding fatty amine to the suspension C, stirring at a certain temperature for a period of time to obtain suspension D, filtering, washing and drying to obtain the ultrafine modified hydromagnesite composite powder.

In step (1) of the preparation method, the median particle diameter of the ultrafine hydromagnesite powder is 0.7-3.5 μm, preferably 0.8-2.5 μm, and further preferably 1.0-2.0 μm.

In step (1) of the preparation method, drying temperature is 125-150° C., preferably 130-140° C., and duration is 4-12 h, preferably 6-8 h.

In step (1) of the preparation method, the concentration of the ultrafine hydromagnesite powder in the suspension is 1.00-50.00 g/L, preferably 5.00-40.00 g/L, and further preferably 10.00-25.00 g/L.

In step (1) of the preparation method, the organic dispersion reagent is toluene, xylene or cyclohexane.

In step (2) of the preparation method, the isocyanate compound is toluene diisocyanate, methylene diphenyl diisocyanate, isophorone diisocyanate or hexamethylene diisocyanate, preferably hexamethylene diisocyanate.

In step (2) of the preparation method, a mass ratio of the ultrafine hydromagnesite powder to the isocyanate compound is 1.0:0.1-1.0, preferably 1.0:0.2-0.8, and further preferably 1.0:0.3-0.6.

In step (2) of the preparation method, the catalyst is at least one of stannous octoate, stannous iso caprylate or dibutyltin dilaurate, and a mass ratio of the ultrafine hydromagnesite powder to the catalyst is 1.0:0.01-0.10, preferably 1.0:0.03-0.08.

In step (2) of the preparation method, stirring temperature is 80-120° C., preferably 90-110° C.; and stirring time is 2-12 h, preferably 4-10 h, and further preferably 6-8 h.

In step (2) of the preparation method, a centrifugation rate is 5000-10000 r/min, and centrifugation time is 5-15 min.

In step (2) of the preparation method, drying temperature is 80-120° C. and duration is 4-12 h.

In step (3) of the preparation method, the organic dispersion reagent is toluene, xylene or cyclohexane.

In step (3) of the preparation method, the concentration of the modified hydromagnesite powder in the suspension is 1.00 g/L-50.00 g/L, preferably 2.00-40.00 g/L, and further preferably 5.00-35.00 g/L.

In step (4) of the preparation method, the fatty amine is one or more of R-NH2, R=$C_nH_{2n+1}$, and n=any positive integer from 8 to 18, preferably n=10 to 16.

In step (4) of the preparation method, a molar ratio of the fatty amine to the isocyanate compound used in step (2) is 1.0:0.1-1.0, preferably 1.0:0.3-0.8, and further preferably 1.0:0.4-0.6.

In step (4) of the preparation method, stirring temperature is 40-120° C., preferably 50-80° C.; and stirring time is 2-12 h, preferably 3-10 h, and further preferably 4-8 h.

In step (4) of the preparation method, a centrifugation rate is 5000-10000 r/min, and centrifugation time is 5-10 min.

In step (4) of the preparation method, drying temperature is 80-120° C. and a duration is 4-12 h.

The present invention provides a modified hydromagnesite powder prepared by the preparation method.

The present invention further provides an inorganic composite polyethylene flame retardant material prepared by the modified hydromagnesite powder, which is prepared by raw materials comprising the following weight parts: 80-90 parts of polyethylene elastomer, 2-20 parts of modified hydromagnesite powder and 0.2-0.8 part of auxiliary agent.

In the present invention, the raw materials of the polyethylene material comprise 80-90 weight parts of polyethylene elastomer, preferably 82-88 weight parts, and further preferably 83-86 weight parts.

In the present invention, the raw materials of the polyethylene material comprise 2-20 weight parts of modified hydromagnesite powder, preferably 4-18 weight parts, and further preferably 6-16 weight parts.

In the present invention, the raw materials of the polyethylene material comprise 0.2-0.8 weight part of auxiliary agent, preferably 0.3-0.7 weight part, and further preferably 0.4-0.5 weight part.

In the present invention, the polyethylene comprises at least one of 2102-TN00, DJ200A, 2220H, 2210H, DJ210, 1150A, 2410T, 1810S, 2420H, 2420K, 3020H, 3020K, 3025K, 1810H, 1816H, 7042, 7042T, 9020, 1802, 7050, 0220KJ, 0220AA, QLLF-20, 7042N, 7042K and 9042, preferably DJ200A.

In the present invention, the auxiliary agent comprises at least one of antioxidants 1010, 1024, 1076 and 168, preferably 1010.

In the present invention, the temperature of extrusion granulation is 160-200° C., preferably 170-185° C.

The ultrafine hydromagnesite powder used in the present invention is a compound of magnesium carbonate and magnesium hydroxide, has a chemical structure of ($3MgCO_3 \cdot Mg(OH)_2 \cdot 3H_2O$) and molar mass of 365.31 g/mol, and is a typical basic magnesium bicarbonate powder material.

The process of preparing hydromagnesite composite powder through chemical modification of the hydromagnesite powder using a modifier in the present invention is shown in FIG. 1. Contact angles of modified hydromagnesite powder are shown in FIG. 2.

DETAILED DESCRIPTION

Figure 1:
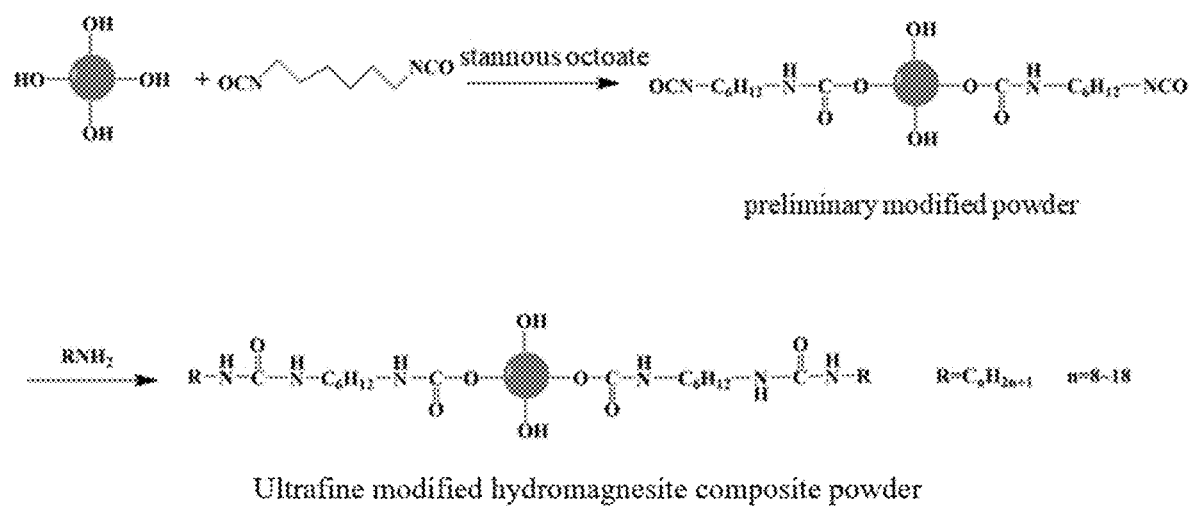
FIG. 1 is a schematic diagram of a modification mechanism of ultrafine hydromagnesite powder.
Figure 2:
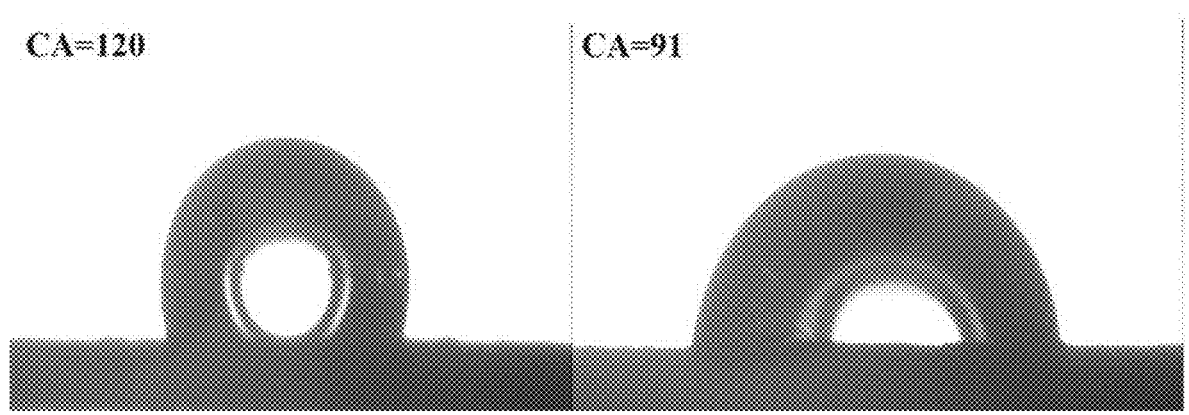
FIG. 2 is a diagram of contact angles of ultrafine modified hydromagnesite powder.

To understand the technical features, purpose and beneficial effects of the present invention more clearly, the technical solutions of the present invention are described in detail below, but shall not be understood as the limitation of the implementation scope of the present invention. In embodiments, the original reagent materials are commercially available, and the experimental methods without specified conditions are conventional methods and conventional conditions well known in the field, or conditions recommended by instrument manufacturers.

Embodiment 1

The present embodiment provides an ultrafine modified hydromagnesite composite powder, and a preparation method and application thereof. The method comprises the following steps:

Step 1: placing ultrafine hydromagnesite powder with a median particle diameter of 1.8 μm in an oven, drying at 135° C. for 8 h, weighing 2.0000 g of the powder, adding 200 mL of xylene, and stirring to obtain a suspension.

Step 2: weighing 0.6000 g of hexamethylene diisocyanate and 0.0600 g of stannous octoate, adding to the suspension, and stirring at 90° C. for 6 h. After the reaction, the suspension is centrifuged and washed at a centrifugation rate of 10000 r/min and centrifugation time of 5 min. Then, the suspension is dried at temperature of 120° C. for 4 h to prepare preliminary modified hydromagnesite powder.

Step 3: weighing 2.0000 g of preliminary modified hydromagnesite powder, adding 200 mL of xylene, and stirring to obtain a suspension.

Step 4: weighing 1.1020 g of lauryl amine and adding to the suspension for reaction at reaction temperature of 50° C. and reaction time of 6 h. After the reaction, the suspension is centrifuged and washed at a centrifugation rate of 10000 r/min and centrifugation time of 10 min. Then, the suspension is dried at temperature of 120° C. for 4 h to prepare the modified hydromagnesite powder.

The preparation of the inorganic composite polyethylene flame retardant material comprises the following steps:
  mixing 85.5 parts of polyethylene DJ200A with 14 parts of modified
  hydromagnesite powder, then adding 0.5 part of antioxidant 1010, mixing evenly, then extruding for granulation at 180° C., and drying at 100° C. to obtain the polyethylene material.

Embodiment 2

Step 1: placing ultrafine hydromagnesite powder with a median particle diameter of 2.0 μm in an oven, drying at 125° C. for 6 h, weighing 3.0000 g of the powder, adding 200 mL of xylene, and stirring to obtain a suspension.

Step 2: weighing 1.5000 g of hexamethylene diisocyanate and 0.1200 g of stannous octoate, adding to the suspension, and stirring at 90° C. for 6 h. After the reaction, the suspension is centrifuged and washed at a centrifugation rate of 10000 r/min and centrifugation time of 5 min. Then, the suspension is dried at temperature of 120° C. for 4 h to prepare preliminary modified hydromagnesite powder.

Step 3: weighing 2.0000 g of preliminary modified hydromagnesite powder, adding 200 mL of xylene, and stirring to obtain a suspension.

Step 4: weighing 3.3061 g of lauryl amine and adding to the suspension for reaction at reaction temperature of 50° C. and reaction time of 6 h. After the reaction, the suspension is centrifuged and washed at a centrifugation rate of 10000 r/min and centrifugation time of 1 min. Then, the suspension is dried at temperature of 120° C. for 4 h to prepare the modified hydromagnesite powder.

The preparation of the inorganic composite polyethylene flame retardant material comprises the following steps:
  mixing 86 parts of polyethylene DJ200A with 13.6 parts of modified hydromagnesite powder, then adding 0.4 part of antioxidant 1010, mixing evenly, then extruding for granulation at 180° C., and drying at 100° C. to obtain the polyethylene material.

Embodiment 3

Step 1: placing ultrafine hydromagnesite powder with a median particle diameter of 2.0 μm in an oven, drying at 125° C. for 6 h, weighing 3.0000 g of the powder, adding 200 mL of xylene, and stirring to obtain a suspension.

Step 2: weighing 1.2000 g of hexamethylene diisocyanate and 0.1200 g of stannous octoate, adding to the suspension, and stirring at 100° C. for 7 h. After the reaction, the suspension is centrifuged and washed at a centrifugation rate of 10000 r/min and centrifugation time of 5 min. Then, the suspension is dried at temperature of 120° C. for 4 h to prepare preliminary modified hydromagnesite powder.

Step 3: weighing 2.0000 g of preliminary modified hydromagnesite powder, adding 200 mL of xylene, and stirring to obtain a suspension.

Step 4: weighing 2.2041 g of lauryl amine and adding to the suspension for reaction at reaction temperature of 60° C. and reaction time of 4 h. After the reaction, the suspension is centrifuged and washed at a centrifugation rate of 10000 r/min and centrifugation time of 10 min. Then, the suspension is dried at temperature of 120° C. for 4 h to prepare the modified hydromagnesite powder.

The preparation of the inorganic composite polyethylene flame retardant material comprises the following steps:
mixing 86 parts of polyethylene DJ200A with 13.6 parts of modified hydromagnesite powder, then adding 0.4 part of antioxidant 1010, mixing evenly, then extruding for granulation at 180° C., and drying at 100° C. to obtain the polyethylene material.

Embodiment 4

Step 1: placing ultrafine hydromagnesite powder with a median particle diameter of 2.0 μm in an oven, drying at 125° C. for 6 h, weighing 3.0000 g of the powder, adding 200 mL of xylene, and stirring to obtain a suspension.

Step 2: weighing 1.2000 g of hexamethylene diisocyanate and 0.1500 g of stannous octoate, adding to the suspension, and stirring at 90° C. for 8 h. After the reaction, the suspension is centrifuged and washed at a centrifugation rate of 10000 r/min and centrifugation time of 5 min. Then, the suspension is dried at temperature of 120° C. for 4 h to prepare preliminary modified hydromagnesite powder.

Step 3: weighing 2.0000 g of preliminary modified hydromagnesite powder, adding 200 mL of xylene, and stirring to obtain a suspension.

Step 4: weighing 2.2041 g of lauryl amine and adding to the suspension for reaction at reaction temperature of 60° C. and reaction time of 4 h. After the reaction, the suspension is centrifuged and washed at a centrifugation rate of 10000 r/min and centrifugation time of 10 min. Then, the suspension is dried at temperature of 120° C. for 4 h to prepare the modified hydromagnesite powder.

The preparation of the inorganic composite polyethylene flame retardant material comprises the following steps:
mixing 83.5 parts of polyethylene DJ200A with 16 parts of modified hydromagnesite powder, then adding 0.5 part of antioxidant 1010, mixing evenly, then extruding for granulation at 180° C., and drying at 100° C. to obtain the polyethylene material.

Embodiment 5

Step 1: placing ultrafine hydromagnesite powder with a median particle diameter of 1.5 μm in an oven, drying at 125° C. for 6 h, weighing 3.0000 g of the powder, adding 200 mL of xylene, and stirring to obtain a suspension.

Step 2: weighing 1.2000 g of hexamethylene diisocyanate and 0.1500 g of stannous octoate, adding to the suspension, and stirring at 100° C. for 6 h. After the reaction, the suspension is centrifuged and washed at a centrifugation rate of 10000 r/min and centrifugation time of 5 min. Then, the suspension is dried at temperature of 120° C. for 4 h to prepare preliminary modified hydromagnesite powder.

Step 3: weighing 2.0000 g of preliminary modified hydromagnesite powder, adding 200 mL of xylene, and stirring to obtain a suspension.

Step 4: weighing 3.3061 g of lauryl amine and adding to the suspension for reaction at reaction temperature of 80° C. and reaction time of 4 h. After the reaction, the suspension is centrifuged and washed at a centrifugation rate of 10000 r/min and centrifugation time of 10 min. Then, the suspension is dried at temperature of 120° C. for 4 h to prepare the modified hydromagnesite powder.

The preparation of the inorganic composite polyethylene flame retardant material comprises the following steps:
mixing 85 parts of polyethylene DJ200A with 14.5 parts of modified hydromagnesite powder, then adding 0.5 part of antioxidant 1010, mixing evenly, then extruding for granulation at 180° C., and drying at 100° C. to obtain the polyethylene material.

Reference Example 1

Steps 1, 2, 3 and 4 are consistent with embodiment 1.
The preparation of the inorganic composite polyethylene flame retardant material comprises the following steps:
mixing 98 parts of polyethylene DJ200A with 1.5 parts of modified hydromagnesite powder, then adding 0.5 part of antioxidant 1010, mixing evenly, then extruding for granulation at 180° C., and drying at 100° C. to obtain the polyethylene material.

Reference Example 2

The ultrafine hydromagnesite powder is not modified.
The preparation of the inorganic composite polyethylene flame retardant material comprises the following steps:
mixing 86 parts of polyethylene DJ200A with 13.6 parts of unmodified hydromagnesite powder, then adding 0.4 part of antioxidant 1010, mixing evenly, then extruding for granulation at 180° C., and drying at 100° C. to obtain the polyethylene material.

Reference Example 3

Step 1 is consistent with embodiment 3.
Step 2: weighing 1.2000 g of hexamethylene diisocyanate, adding to the suspension, and stirring at 100° C. for 7 h. After the reaction, the suspension is centrifuged and washed at a centrifugation rate of 10000 r/min and centrifugation time of 5 min. Then, the suspension is dried at temperature of 120° C. for 4 h to prepare preliminary modified hydromagnesite powder.

Step 3: weighing 2.0000 g of preliminary modified hydromagnesite powder, adding 200 mL of xylene, and stirring to obtain a suspension.

Step 4: weighing 2.2041 g of lauryl amine and adding to the suspension for reaction at reaction temperature of 60° C. and reaction time of 4 h. After the reaction, the suspension is centrifuged and washed at a centrifugation rate of 10000 r/min and centrifugation time of 10 min. Then, the suspension is dried at temperature of 120° C. for 4 h to prepare the modified hydromagnesite powder.

The preparation of the inorganic composite polyethylene flame retardant material comprises the following steps:
mixing 86 parts of polyethylene DJ200A with 13.6 parts of modified hydromagnesite powder, then adding 0.4 part of antioxidant 1010, mixing evenly, then extruding for granulation at 180° C., and drying at 100° C. to obtain the polyethylene material.

Reference Example 4

Steps 1, 2 and 3 are consistent with embodiment 4.

Step 4: weighing 0.0652 g of n-butylamine and adding to the suspension for reaction at reaction temperature of 60° C. and reaction time of 4 h. After the reaction, the suspension is centrifuged and washed at a centrifugation rate of 10000 r/min and centrifugation time of 10 min. Then, the suspension is dried at temperature of 120° C. for 4 h to prepare the modified hydromagnesite powder.

The preparation of the inorganic composite polyethylene flame retardant material comprises the following steps:
mixing 83.5 parts of polyethylene DJ200A with 16 parts of modified hydromagnesite powder, then adding 0.5 part of antioxidant 1010, mixing evenly, then extruding for granulation at 180° C., and drying at 100° C. to obtain the polyethylene material.

The properties of the polyethylene materials prepared by embodiments 1 to 5 and reference examples 1 to 4 are detected, wherein the tensile strength is tested according to GB/T 1040-1992 standard, and the tensile speed is 200 mm/min+10%; and flame retardant properties are tested according to GB/T 2408-2008, and spline thickness is 3.0 mm. According to the requirements of standard GB8924-2005, the test materials in the $O_2/N_2$ mixed flow are detected for the minimum oxygen concentration required by flame combustion.

Results are shown in Table 1.

TABLE 1

Properties of Different Polyethylene Materials

| Test Sample | Flame Retardant Grade | Limiting Oxygen Index/% | Tensile Strength/MPa |
| --- | --- | --- | --- |
| Embodiment 1 | V-0 | 28.5 | 13.8 |
| Embodiment 2 | V-0 | 28.0 | 13.2 |
| Embodiment 3 | V-0 | 28.1 | 13.3 |
| Embodiment 4 | V-0 | 28.4 | 14.0 |
| Embodiment 5 | V-0 | 27.5 | 13.7 |
| Reference example 1 | V-1 | 24.7 | 9.9 |
| Reference example 2 | NR | 20.1 | 7.6 |
| Reference example 3 | V-2 | 21.6 | 8.5 |
| Reference example 4 | V-2 | 22.2 | 8.2 |

It can be seen from Table 1 that the obtained modified powder can improve the flame retardant property of the polyethylene material, and all reaches level V-0. The reason may be that the modified hydromagnesite powder reduces the surface polarity, enhances the compatibility and dispersibility with the polyethylene matrix material, decomposes and absorbs heat during combustion, and improves the flame retardant property of the material. However, the composite material prepared by adding the unmodified hydromagnesite powder to polyethylene has no flame retardant grade, and other situations such as insufficient addition of modified powder or inadequate modification will affect the improvement of the flame retardant property of the composite material.

The limiting oxygen index is similar to the flame retardant grade. The introduction of isocyanate and fatty amine can significantly improve the limiting oxygen index of polyethylene composite material, but the limiting oxygen index of the composite material may be decreased significantly when the powder is not modified properly or even not modified. The reason may be that there is a good synergistic flame retardant effect between the modifier and the hydromagnesite powder. The double flame retardant effect of a condensed phase and a gas phase can be exerted at the same time in different degradation stages during the combustion. When the powder is not modified properly or not modified, the hydromagnesite powder generates a large-scale agglomeration phenomenon due to poor affinity with the basis material, resulting in a low limiting oxygen index and poor flame retardant property.

In terms of the tensile strength, the hydromagnesite powder which is modified properly can play a toughening role, thereby improving the tensile strength of the composite material. However, when the powder is not modified properly or even not modified, the tensile strength of the composite material is less improved. After appropriate modification, the modifier molecule is wrapped on the surface of hydromagnesite powder, which can greatly improve the affinity between the powder and the polyethylene matrix. The powder can be well uniformly distributed in the polyethylene matrix, and can form an intertwined three-dimensional structural network with a matrix molecular chain, which is conducive to improving the capability of the composite material to resist external stretching.

Finally, it should be noted that the above embodiments are only used to illustrate the implementation process and characteristics of the present invention, but not to limit the technical method of the present invention. Although the present invention is described in detail by reference to the above embodiments, those ordinary skilled in the art shall understand that: the present invention may still be modified or equivalently replaced, and any modification or partial replacement without deviating from the spirit and scope of the present invention shall be covered within the protection scope of the present invention.

What is claimed is:

1. An ultrafine modified hydromagnesite composite powder and a preparation method thereof, wherein the method comprises the following steps:
    (1) drying ultrafine hydromagnesite powder, then adding 200 ml of xylene and stirring to obtain suspension A;
    (2) adding hexamethylene diisocyanate and stannous octoate to the suspension A, stirring to react to obtain suspension B, filtering, centrifugally washing and drying to obtain preliminary modified hydromagnesite powder;
    (3) taking the modified hydromagnesite powder, adding 200 ml of xylene, and stirring to obtain suspension C;
    (4) adding lauryl amine to the suspension C, stirring to react to obtain suspension D, filtering, centrifugally washing and drying to obtain the ultrafine modified hydromagnesite composite powder.

2. The preparation method according to claim 1, wherein in step (1), drying temperature is 125-150° C., and duration is 4-12 h; a median particle diameter of the ultrafine hydromagnesite powder is 0.7-3.5 μm; and a concentration of the ultrafine hydromagnesite powder in the suspension is 1.00 g/L-50.00 g/L.

3. The preparation method according to claim 1, wherein in step (2), a mass ratio of the ultrafine hydromagnesite powder to the isocyanate compound is 1.0:0.1-1.0; a mass ratio of the ultrafine hydromagnesite powder to stannous octoate is 1.0:0.01-0.10; stirring temperature is 80-120° C., and stirring time is 2-12 h; a centrifugation rate is 5000-10000 r/min, and centrifugation time is 5-15 min; drying temperature is 80-120° C. and duration is 4-12 h.

4. The preparation method according to claim 1, wherein in step (3), the concentration of the modified hydromagnesite powder in the suspension is 1.00 g/L-50.00 g/L.

5. The preparation method according to claim 1, wherein in step (4), a molar ratio of lauryl amine to hexamethylene diisocyanate used in step (2) is 1.0:0.1-1.0; stirring temperature is 40-120° C., and stirring time is 2-12 h; a centrifugation rate is 5000-10000 r/min, and centrifugation time is 5-10 min; drying temperature is 80-120° C. and a duration is 4-12 h.

6. An ultrafine modified hydromagnesite composite powder prepared by the preparation method according to claim 1.

7. An application of the ultrafine modified hydromagnesite composite powder according to claim 6 in polyethylene elastomer material.

8. The application according to claim 7, wherein the used raw materials comprise the following weight parts: 80-90 parts of polyethylene elastomer, 2-20 parts of ultrafine modified hydromagnesite composite powder and 0.2-0.8 part of auxiliary agent.

9. The application according to claim 8, wherein a preparation method of the polyethylene elastomer material comprises the following steps: mixing the polyethylene elastomer, the ultrafine modified hydromagnesite composite powder and the auxiliary agent, and extruding for granulation at 160-200° C. to prepare the polyethylene elastomer material.

* * * * *